US008746030B2

(12) United States Patent
Kasahara (10) Patent No.: US 8,746,030 B2
(45) Date of Patent: Jun. 10, 2014

(54) RATIONALITY DIAGNOSIS METHOD AND RATIONALITY DIAGNOSIS APPARATUS FOR SENSOR INSIDE TANK

(75) Inventor: Hiroyuki Kasahara, Saitama (JP)

(73) Assignee: Bosch Corporation, Tokyo (JP)

( * ) Notice: Subject to any disclaimer, the term of this patent is extended or adjusted under 35 U.S.C. 154(b) by 640 days.

(21) Appl. No.: 13/000,709

(22) PCT Filed: Oct. 14, 2008

(86) PCT No.: PCT/JP2008/068528
§ 371 (c)(1),
(2), (4) Date: Dec. 22, 2010

(87) PCT Pub. No.: WO2009/157102
PCT Pub. Date: Dec. 30, 2009

(65) Prior Publication Data
US 2011/0107812 A1 May 12, 2011

(30) Foreign Application Priority Data

Jun. 27, 2008 (JP) ................................ 2008-168194

(51) Int. Cl.
*G01F 25/00* (2006.01)
*G01N 33/00* (2006.01)
(52) U.S. Cl.
USPC .................................. 73/1.02; 73/1.73; 374/1
(58) Field of Classification Search
USPC ...................................... 73/1.02, 1.73; 374/1
See application file for complete search history.

(56) References Cited

U.S. PATENT DOCUMENTS

2007/0113625 A1* 5/2007 Sasanuma et al. ............ 73/61.46
2008/0107942 A1* 5/2008 Muramatsu ..................... 429/23
2010/0031633 A1* 2/2010 Kitazawa ......................... 60/276

FOREIGN PATENT DOCUMENTS

| JP | 1114522 | | 5/1989 |
| JP | 08138182 | A * | 5/1996 |
| JP | 2007056741 | | 3/2007 |
| JP | 2007114181 | | 5/2007 |
| JP | 2008000037 | A * | 1/2008 |
| KR | 20020044223 | | 6/2002 |

OTHER PUBLICATIONS

Chinese Patent Office Action for Application No. 200880128677.6 dated May 31, 2012 (5 pages—with English Translation).

* cited by examiner

*Primary Examiner* — Hezron E Williams
*Assistant Examiner* — Nashmiya Fayyaz
(74) *Attorney, Agent, or Firm* — Michael Best & Friedrich LLP (57) ABSTRACT

A rationality diagnosis method and a rationality diagnosis apparatus for a sensor inside a tank are provided. The rationality diagnosis method and the rationality diagnosis apparatus can accurately and easily perform a diagnosis to determine whether rationality of all sensors is maintained.
The rationality diagnosis method for the sensor inside the tank performs a rationality diagnosis of a concentration sensor, a liquid level sensor and a temperature sensor that are provided inside the tank that stores liquid. The rationality diagnosis method is characterized by diagnosing whether the rationality is lost in one of the concentration sensor, the liquid level sensor and the temperature sensor by determining whether there exists any contradiction between respective sensor values of the concentration sensor, the liquid level sensor and the temperature sensor.

8 Claims, 6 Drawing Sheets

| | | LIQUID LEVEL SENSOR | | | | |
|---|---|---|---|---|---|---|
| | | ε = ε air<br>EMPTY | ε = ε diesel<br>DIESEL OIL | ε = ε ureaice<br>FROZEN | ε = ε ureawtr<br>LIQUID | RELATIVE PERMITTIVITY ε / TEMPERATURE t (°C) |
| CONCENTRATION SENSOR | HEAT CONDUCTIVITY RATE λ (W / m · K) | | | | | TEMPERATURE SENSOR |
| | λ = λ air<br>EMPTY | OK | NG | NG | NG | ≤ -11 |
| | | NG | NG | NG | NG | > -11 |
| | λ = λ diesel<br>DIESEL OIL | NG | OK | NG | NG | ≤ -11 |
| | | NG | NG | NG | NG | > -11 |
| | λ = λ ureaice<br>FROZEN | NG | NG | OK | NG | ≤ -11 |
| | | NG | NG | NG | NG | > -11 |
| | λ = λ ureawtr<br>LIQUID | NG | NG | NG | NG | ≤ -11 |
| | | NG | NG | NG | OK | > -11 |

Fig.5

| CONCENTRATION SENSOR | LIQUID LEVEL SENSOR | | TEMPERATURE SENSOR |
|---|---|---|---|
| HEAT CONDUCTIVITY RATE λ (W/m·K) \ RELATIVE PERMITTIVITY ε | ε ≦ ε ureaice<br>EMPTY, DIESEL OIL OR FROZEN | ε = ε ureawtr<br>LIQUID | RELATIVE PERMITTIVITY ε \ TEMPERATURE t (°C) |
| λ = λ air<br>EMPTY | OK | NG | ≦ −11 |
|  |  |  | > −11 |
| λ = λ diesel<br>DIESEL OIL | OK | NG | ≦ −11 |
|  |  |  | > −11 |
| λ = λ ureaice<br>FROZEN | OK | NG | ≦ −11 |
|  | NG |  | > −11 |
| λ = λ ureawtr<br>LIQUID | NG | NG | ≦ −11 |
|  |  | OK | > −11 |

RATIONALITY DIAGNOSIS METHOD AND RATIONALITY DIAGNOSIS APPARATUS FOR SENSOR INSIDE TANK

TECHNICAL FIELD

The present invention relates to a rationality diagnosis method and a rationality diagnosis apparatus for a sensor inside a tank. The invention particularly relates to a rationality diagnosis method and a rationality diagnosis apparatus for a sensor inside a tank, the sensor being structured with a plurality of sensors.

BACKGROUND ART

Nitrogen oxides ("$NO_x$") that may affect the environment are included in exhaust gas discharged from an internal combustion engine such as a diesel engine. In known art, as one form of an exhaust gas purification apparatus used for purifying the $NO_x$, a SCR (Selective Catalytic Reduction) system is known. In the SCR system, a selective reducing catalyst is provided in an exhaust path and the $NO_x$ is reduced and purified in the selective reducing catalyst using a reducing agent. This SCR system supplies the reducing agent, such as urea aqueous solution and unburned fuel (HC) etc., into the exhaust path located on an upstream side of the selective reducing catalyst, and selectively reduces and purifies the $NO_x$ in the exhaust gas using the reducing agent, the exhaust gas flowing into the selective reducing catalyst.

Further, besides the SCR system in which the selective reducing catalyst is used, an exhaust gas purification apparatus using a $NO_x$ storage catalyst is known. In the exhaust gas purification apparatus, the $NO_x$ in the exhaust gas is stored when an air-fuel ratio of the exhaust gas is lean, and when the air-fuel ratio is turned to be rich, the $NO_x$ is discharged and then reduced and purified using the unburned fuel in the exhaust gas. As one form of the exhaust gas purification apparatus, there is an exhaust gas purification apparatus having a structure in which the unburned fuel is directly added into an upstream side of the $NO_x$ storage catalyst.

As a representative apparatus for adding the urea aqueous solution, the unburned fuel etc. in the above-described exhaust gas purification apparatuses, there is an injection-type additive supply apparatus in which an additive is pressure fed by a pump and supplied into an exhaust path via an injector connected to an exhaust pipe. Further, as an apparatus for spraying the urea aqueous solution, there is also an air-assist type reducing agent supply apparatus in which the urea aqueous solution is atomized inside a mixing chamber in advance using high pressure air and the urea aqueous solution is sprayed into an exhaust path via an injection nozzle connected to an exhaust pipe.

In such an additive supply apparatus, a tank for storing the additive, such as the urea aqueous solution and the unburned fuel, is provided. Then, in order to monitor whether or not there is any abnormality in a state of the additive, a concentration sensor, a liquid level sensor and a temperature sensor are provided inside the tank. For example, with respect to the reducing agent supply apparatus that uses the urea aqueous solution as the reducing agent, a reducing agent supply apparatus that is provided with an assembly for supplying the urea aqueous solution is disclosed (refer to Patent Document 1), the assembly including a quality sensor (concentration sensor), a temperature sensor and a level sensor (liquid level sensor) inside a storage container (tank) and a pump.

Patent Document 1: JP-T-2002-527660 (Claim 12, Paragraph [0038])

DISCLOSURE OF THE INVENTION

Problems that the Invention is to Solve

By the way, at present, when a reducing agent supply apparatus is mounted on a vehicle etc., it is becoming compulsory to perform a rationality diagnosis for each sensor provided inside a tank in order to check reliability of each of the sensors. This is because if rationality is lost in one of the sensors, it may result in excess or deficiency of an actual addition amount of a reducing agent with respect to a target addition amount of the reducing agent required for reducing and purifying exhaust gas, and there is a possibility that the $NO_x$ is discharged into the air when the reducing agent is in deficiency, and ammonia and hydrocarbon are discharged into the air when the reducing agent is in excess. Therefore, a rationality diagnosis method is desired that can accurately diagnose whether or not the rationality of every sensor provided in the tank is maintained.

Therefore, the inventor of the invention has made a dedicated effort and has completed the invention by discovering that this type of problem can be solved by performing a rationality diagnosis for each sensor through determining whether or not there is any contradiction in a sensor value of each sensor using a rationality diagnosis method for the sensors inside the tank. Namely, the object of the invention is to provide a rationality diagnosis method and a rationality diagnosis apparatus for the sensors inside the tank, the rationality diagnosis method and the rationality diagnosis apparatus being able to accurately and easily diagnose whether or not the rationality of every sensor is maintained.

Means for Solving the Problems

According to the invention, the above-described problem can be solved by providing a rationality diagnosis method for a sensor inside a tank, the rationality diagnosis method performing a rationality diagnosis of a concentration sensor, a liquid level sensor and a temperature sensor that are provided inside the tank that stores liquid. The rationality diagnosis method is characterized in that it is diagnosed whether rationality is lost in one of the concentration sensor, the liquid level sensor and the temperature sensor by determining whether there exists any contradiction between respective sensor values detected by the concentration sensor, the liquid level sensor and the temperature sensor.

Further, when the rationality diagnosis method for the sensor inside the tank according to the invention is performed, it is preferable that the rationality diagnosis is performed by determining a state of the liquid for each of the sensor values based on each of the sensor values and by determining whether there exists any contradiction between the states of the liquid.

Further, when the rationality diagnosis method for the sensor inside the tank according to the invention is performed, it is preferable that it is determined, based on the sensor values of the concentration sensor and the liquid level sensor, whether the liquid is in one of states of being frozen, being liquefied and being in deficiency, and that it is determined whether there exists any contradiction between the respective states of the liquid after determining, based on the sensor value of the temperature sensor, whether the liquid is in one of the states of being frozen and being liquefied.

Further, when the rationality diagnosis method for the sensor inside the tank according to the invention is performed, it is preferable that the rationality diagnosis is performed based on a value of a heat conductivity rate that is acquired based on the sensor value of the concentration sensor.

Further, when the rationality diagnosis method for the sensor inside the tank according to the invention is performed, it is preferable that the rationality diagnosis is performed based on a value of a relative permittivity that is acquired based on the sensor value of the liquid level sensor.

Further, another aspect of the invention is a rationality diagnosis apparatus for a sensor inside a tank, the rationality diagnosis apparatus performing a rationality diagnosis of a concentration sensor, a liquid level sensor and a temperature sensor that are provided inside the tank that stores liquid. The rationality diagnosis apparatus is characterized by being provided with a rationality determining portion. The rationality determining portion diagnoses whether rationality is lost in one of the concentration sensor, the liquid level sensor and the temperature sensor by determining whether there exists any contradiction between respective states of the liquid by mutually comparing a first signal that indicates the state of the liquid acquired based on a sensor value of the concentration sensor, a second signal that indicates the state of the liquid acquired based on a sensor value of the liquid level sensor and a third signal that indicates the state of the liquid acquired based on a sensor value of the temperature sensor.

Advantage of the Invention

According to a rationality diagnosis method and a rationality diagnosis apparatus for a sensor inside a tank according to the invention, through mutually comparing respective sensor values of a concentration sensor, a liquid level sensor and a temperature sensor and determining whether or not there exists any contradiction among the sensor values, it is accurately and easily determined whether or not rationality of one of the sensors is lost. In particular, the rationality diagnosis apparatus identifies a state of liquid inside the tank based on the respective sensor values and determines whether or not there exists any contradiction in the states of the liquid such that a more accurate rationality diagnosis for the sensors inside the tank is performed.

Therefore, repair and replacement of the sensors are performed swiftly, and the state of the liquid stored inside the tank is understood accurately.

BEST MODE FOR CARRYING OUT THE INVENTION

With reference to the figures, embodiments related to a rationality diagnosis method and a rationality diagnosis apparatus for a sensor in a tank according to the invention will be described below in concrete terms. However, note that the embodiments to be described below only show an aspect of the invention without limiting the invention, and the embodiments can be modified as chosen within the scope of the invention.

Note that, in each figure, members denoted by the same reference characters illustrate the same members, and thus a related description will be omitted as appropriate.

First Embodiment

1. Exhaust Gas Purification Apparatus

Figure 1:
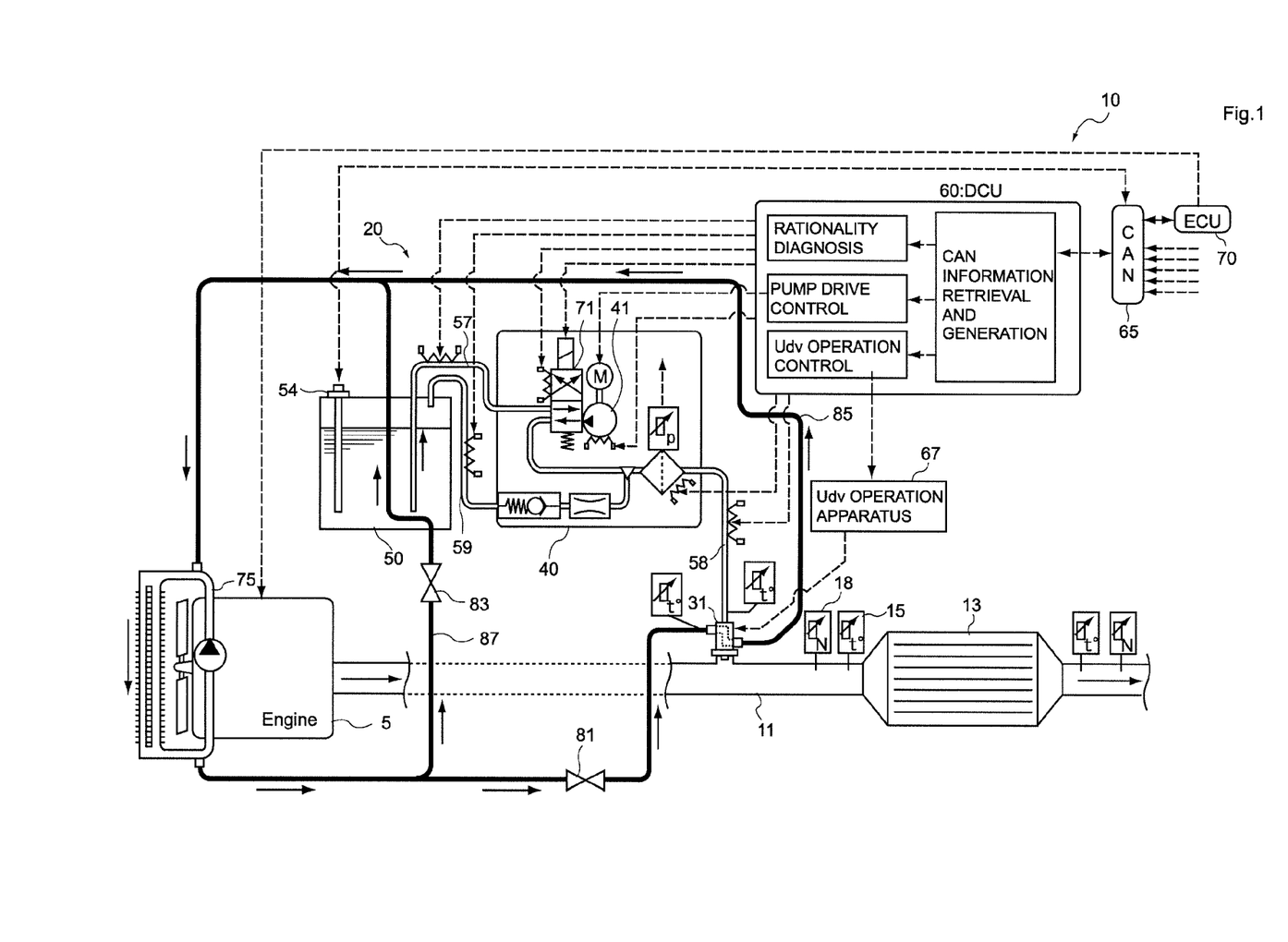
FIG. 1 is a diagram showing a structure of an exhaust gas purification apparatus provided with a rationality diagnosis apparatus according to a first embodiment.

FIG. 1 shows a structural example of an exhaust gas purification apparatus 10 of an internal combustion engine 5 (hereinafter it may be simply referred to as an "exhaust gas purification apparatus") provided with a rationality diagnosis apparatus for a sensor 54 inside a tank according to a first embodiment. The exhaust gas purification apparatus 10 is the exhaust gas purification apparatus 10 that injects and supplies urea aqueous solution as a reducing agent into an upstream side of a reducing catalyst 13 provided in an exhaust path and selectively reduces and purifies $NO_x$ in the reducing catalyst 13, the $NO_x$ being contained in exhaust gas. The exhaust gas purification apparatus 10 is provided in an exhaust pipe 11 connected to the internal combustion engine 5, and main elements of the exhaust gas purification apparatus 10 include the reducing catalyst 13 that selectively reduces the $NO_x$ contained in the exhaust gas and a reducing agent supply apparatus 20 that injects and supplies the urea aqueous solution into the exhaust pipe 11 on the upstream side of the reducing catalyst 13.

2. Reducing Agent Supply Apparatus

The reducing agent supply apparatus 20 provided in the exhaust gas purification apparatus 10 includes a reducing agent injection valve 31 fixed to the exhaust pipe 11 on the upstream side of the reducing catalyst 13, a tank 50 in which the urea aqueous solution is stored, a pump module 40 that includes a pump 41 which pressure feeds the urea aqueous solution inside the tank 50 to the reducing agent injection valve 31 and a control device (hereinafter referred to as "DCU: Dosing Control Unit") 60 that controls injection of the reducing agent which is injected and supplied into the exhaust pipe 11. Further, the pump module 40 and the reducing agent injection valve 31 are connected by a first supply path 58, the tank 50 and the pump module 40 are connected by a second supply path 57, and further, the pump module 40 and the tank 50 are connected by a circulation path 59.

In the reducing agent supply apparatus 20 provided in the exhaust gas purification apparatus 10, the DCU 60 is connected to a CAN 65. The CAN 65 is connected to a control unit (hereinunder referred to as "ECU (Electronic Control Unit)") 70 that controls an operational status of the internal combustion engine, and information from a sensor provided in the exhaust gas purification apparatus 10 and information related to the operational status of the internal combustion engine, such as a fuel injection amount, an injection timing and a rotational speed, are written into the CAN 65. Then, the DCU 60 connected to the CAN 65 reads the information on the CAN 65, and the DCU 60 can also output information onto the CAN 65.

Note that, even though the ECU 70 and the DCU 60 are formed as separate control units and designed to be able to exchange information via the CAN 65 in the present embodiment, it is also possible to form the ECU 70 and the DCU 60 as one control unit.

In the reducing agent supply apparatus 20, the urea aqueous solution inside the tank 50 is pressure fed toward the reducing agent injection valve 31 by the pump 41. In addition, feedback control of the pump 41 is performed while detecting pressure within the first supply path 58, and by returning excess urea aqueous solution to the tank 50 via the circulation path 59, the pressure within the first supply path 58 is thus maintained at a predetermined value. In this state, an opening and closing operation of the reducing agent injection valve 31 is performed by a reducing agent injection valve operation apparatus (indicated as "Udv operation apparatus" in FIG. 1) 67 such that a predetermined amount of the urea aqueous solution is injected into the exhaust path. The reducing agent injection valve operation apparatus 67 performs energization control of the reducing agent injection valve 31 based on a reducing agent injection indication value transmitted by the DCU 60.

A part of a first cooling water circulation path 85, which branches out from a cooling water path 75 of the internal combustion engine 5 once and converges into the cooling water path 75 again, is provided at the reducing agent injection valve 31. A first cooling water flow rate control valve 81 is provided in the first cooling water circulation path 85, and cooling of the reducing agent injection valve 31 is performed by adjusting a circulation amount of cooling water using the first cooling water flow rate control valve 81.

Further, a second cooling water circulation path 87 is connected to the first cooling water circulation path 85, the second cooling water circulation path 87 branching out from the first cooling water circulation path 85 once and converging into the first cooling water circulation path 85 again. A part of the second cooling water circulation path 87 is provided in the tank 50. In addition, a second cooling water flow rate control valve 83 is provided in the second cooling water circulation path 87, and by adjusting the circulation amount of the cooling water, a temperature of the urea aqueous solution inside the tank 50 is adjusted. In this case, the cooling water of the internal combustion engine 5 is not only used for cooling the urea aqueous solution, but also for unfreezing the urea aqueous solution when the urea aqueous solution is frozen and for maintaining the temperature of the urea aqueous solution under cold conditions.

Further, a pump module 40 is provided with a reverting valve 71. By driving the pump 41 in such a case in which the reducing agent supply apparatus 20 does not perform injection control of the urea aqueous solution, the urea aqueous solution in the reducing agent supply system (which includes the pump module 40, the reducing agent injection valve 31, the first supply path 58, the second supply path 57 etc.) is collected into the tank 50. Therefore, under a temperature condition in which the urea aqueous solution is likely to be frozen, such as when it is cold, for instance, even if the internal combustion engine 5 is stopped and control of the reducing agent supply apparatus 20 is not performed, freezing of the urea aqueous solution in the reducing agent supply system is prevented. Then, after that, when operation of the internal combustion engine is restarted, an injection failure is not caused by clogging.

The reverting valve 71 is a switching valve having a function, for example, of switching a flow path of the urea aqueous solution from a forward direction from the tank 50 toward the pump module 40 to a backward direction from the pump module 40 toward the tank 50. When an ignition switch of the internal combustion engine is turned off, the urea aqueous solution is collected into the tank 50 by switching the flow path to the backward direction.

3. Sensors Inside the Tank (1) Sensor Unit

In the present embodiment, the tank 50 is provided with a sensor unit 54 having functions of a concentration sensor, a liquid level sensor and a temperature sensor. The sensor unit 54 includes a concentration sensor portion that measures a concentration of the urea aqueous solution inside the tank 50, a liquid level sensor portion that measures a remaining amount of the urea aqueous solution inside the tank 50 and a temperature sensor portion that measures a temperature of the urea aqueous solution inside the tank 50. Sensor values detected by respective sensor portions of the sensor unit 54 are output as signals indicating information relating to the concentration, the remaining amount and the temperature of the urea aqueous solution inside the tank 50.

This sensor unit 54 is provided to monitor whether or not the urea aqueous solution is contained in a sound state inside the tank 50.

For example, when an injection amount of the urea aqueous solution is determined, it is considered as a prerequisite that the concentration of the urea aqueous solution is kept within a predetermined range. If the concentration of the urea aqueous solution inside the tank is over or under the predetermined range, there is a possibility that excess or deficiency of an amount of ammonia generated by hydrolysis may be caused. Therefore, the concentration sensor portion is provided to monitor whether or not the concentration of the urea aqueous solution is kept within the predetermined range.

Further, if the remaining amount of the urea aqueous solution is lacking or the urea aqueous solution is frozen, there is a possibility that an amount of the urea aqueous solution that is determined by the DCU 60 may not be injected accurately. Therefore, the liquid level sensor portion and the temperature sensor portion are provided to monitor whether the remaining amount of the urea aqueous solution is kept greater than or equal to a predetermined value and the temperature of the urea aqueous solution is kept higher than a freezing temperature.

Then, for example, when any abnormality is found with respect to the concentration or the liquid level of the urea aqueous solution, the injection control of the urea aqueous solution is stopped, and further a warning signal to stop the internal combustion engine immediately is issued. Further, when any abnormality is found with respect to the temperature of the urea aqueous solution, the above-described temperature control of the urea aqueous solution is performed using the engine cooling water.

In addition, when a liquid other than the urea aqueous solution is contained inside the tank 50 by mistake, reduction and purification of the $NO_x$ is not performed, and further, depending on the liquid, there is a possibility that a failure or an accident may be induced. A representative liquid which is likely to be contained inside the tank by mistake is diesel oil, which is used as a fuel for the internal combustion engine. Thus, the concentration sensor portion of the sensor unit 54 provided in the tank 50 is also used to determine whether the liquid inside the tank 50 is the urea aqueous solution or the diesel oil.

Although a structure of a known sensor is used as a structure of the respective sensor portions that form the sensor unit 54, examples of measurement principles with which a concentration, a liquid level and a temperature of a medium is measured by using the respective sensor portions will be briefly described below.

(2) Concentration Sensor Portion

The concentration sensor portion of the sensor unit 54 has a structure in which the medium surrounding a concentration sensor element is heated by supplying a constant current for a predetermined time period to a heat resistive element provided in the concentration sensor element, which is immersed in the liquid, and in which a concentration of the liquid is calculated and output by detecting a voltage change at both ends of the heat resistive element, the voltage change being caused by energization for the predetermined time period.

Namely, the concentration sensor portion determines and outputs the concentration of the urea aqueous solution by comparing a difference $\Delta V(V2-V1)$ between a voltage value V1, which is output in accordance with a resistance value of the heat resistive element just after the energization is started, and a voltage value V2, which is output in accordance with the resistance value of the heat resistive element after the predetermined time period elapses, against pre-stored $\Delta V$ values corresponding to various concentrations of the urea aqueous solution.

Further, the concentration sensor portion calculates a heat conductivity rate $\lambda$ of the medium based on the voltage change $\Delta V$ at the both ends of the heat resistive element, and outputs a calculation result. The heat conductivity rate $\lambda$ is different depending on each case, such as, for example, when the urea aqueous solution is liquefied, the urea aqueous solution is frozen, nothing is contained inside the tank or the diesel oil is contained inside the tank. Therefore, a different value of the heat conductivity rate $\lambda$ is output based on a state of the medium inside the tank.

With respect to a calculation method of the heat conductivity rate $\lambda$ of the medium, when it is assumed that a temperature gradient of the medium is gradT, an expression $\Delta V=\lambda \times gradT$ is established. Thus as one example, the heat conductivity rate $\lambda$ of the medium is calculated using a relational expression $\lambda=\Delta V/gradT$. Then, by comparing the value of the heat conductivity rate $\lambda$ calculated in such a manner against each pre-stored value of the heat conductivity rate $\lambda$ of air, the diesel oil, the frozen urea aqueous solution and the liquefied urea aqueous solution, the concentration sensor portion can determine the state of the medium.

There is no intension to limit the values, but it is generally known that the heat conductivity rate $\lambda$ of the air ($\lambda$ air) $\approx 0.0241$, the heat conductivity rate $\lambda$ of the diesel oil ($\lambda$ diesel)$\approx 0.07$ to $0.17$, the heat conductivity rate $\lambda$ of the frozen 32.5% urea aqueous solution ($\lambda$ ureaice)$\approx 0.75$ and the heat conductivity rate $\lambda$ of the liquefied 32.5% urea aqueous solution ($\lambda$ ureawtr)$\approx 0.57$.

(3) Liquid Level Sensor Portion

The liquid level sensor portion of the sensor unit 54 is formed to monitor a remaining amount of the medium by applying a predetermined alternating voltage to a detecting portion having a pair of electrodes arranged at a predetermined height and by detecting whether or not a voltage acquired as a result of converting an electric current flowing at this time is greater than or equal to a predetermined value. In other words, since a relative permittivity of the urea aqueous solution is significantly higher than that of the air, the diesel oil or the frozen urea aqueous solution, the liquid level sensor portion detects whether or not the liquid exists up to the height location at which the pair of the electrodes are arranged and outputs the detection result, while taking advantage of the fact that when the urea aqueous solution exists between the electrodes, a voltage that is greater than or equal to the predetermined value is generated between the electrodes.

Figure 2:
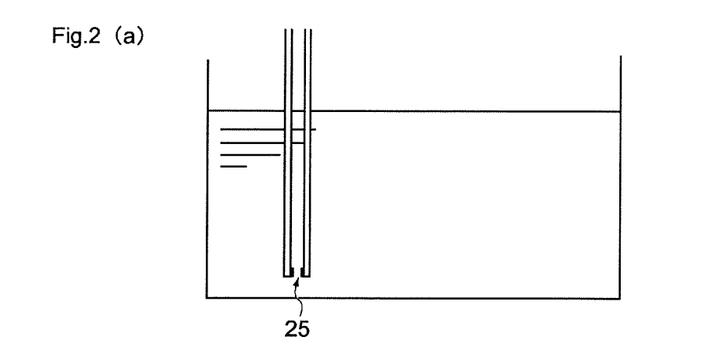
FIG. 2 is a diagram illustrating a structural example of a liquid level sensor that is used in a sensor unit according to the first embodiment.

For example, when the liquid level sensor portion monitors whether or not a certain amount of the urea aqueous solution remains inside the tank, it is sufficient that only one detecting portion 25 having a pair of electrodes is provided as shown in FIG. 2(*a*). When the liquid level sensor portion is required to monitor the remaining amount of the urea aqueous solution in more detail, a plurality of detecting portions 25*a* to 25*c* may be provided at different heights, respectively, the detecting portions 25*a* to 25*c* each having a pair of electrodes as shown in FIG. 2(*b*).

Further, the liquid level sensor portion according to the present embodiment outputs not only a result of whether or not the urea aqueous solution exists up to the height at which the detecting portion is arranged, but also a voltage value V which is generated when the voltage is applied to the detecting portion. The voltage value V is used for calculating a relative permittivity $\epsilon$ of the medium existing between the pair of the electrodes in a liquid level sensor value processing portion of the DCU 60 described below.

Note that, in the liquid level sensor portion of the sensor unit 54 according to the present embodiment, a type of the liquid level sensor is used, which detects whether or not the liquid exists up to the predetermined height location at which the detecting portion is arranged. A case will be described under a third embodiment, in which a type of the liquid level sensor is used that detects the remaining amount of the liquid in detail based on an electrostatic capacitance value that continuously changes in accordance with the remaining amount of the liquid.

Further, when the liquid level sensor portion with a plurality of the detecting portions arranged at different heights is used, each of the detecting portions having the pair of the electrodes, it is possible for the liquid level sensor portion by itself to perform a rationality diagnosis by mutually comparing the voltage value V generated between the electrodes of each of the detecting portion. However, like the liquid level sensor portion according to the present embodiment, when the liquid level sensor with only one detecting portion is used, since it is not possible for the liquid level sensor portion to perform the rationality diagnosis by itself, the invention becomes particularly effective.

(4) Temperature Sensor Portion

The temperature sensor portion of the sensor unit 54 causes the heat resistive element to be immersed in the liquid, and calculates and outputs a temperature t of the liquid after detecting a heat resistance value based on the temperature of the liquid.

Note that when the concentration sensor, the liquid level sensor and the temperature sensor are structured as a sensor unit, generally speaking, part of the electrodes, the heat resistance elements etc., which form the respective sensor portions, are mutually shared.

4. Rationality Diagnosis Apparatus (DCU) and Rationality Diagnosis Method for the Sensor Inside the Tank In the present embodiment, the DCU 60 functions as the rationality diagnosis apparatus of the sensor unit 54, the DCU performing the injection control of the urea aqueous solution. The DCU 60 is basically an apparatus that performs operation control of the reducing agent injection valve 31 according to various pieces of information existing on the CAN 65 such that an appropriate amount of the urea aqueous solution is supplied into the exhaust pipe 11.

In concrete terms, the DCU 60 maintains a pressure inside the first supply path 58 at an almost constant value by continuously reading in information related to a pressure of the reducing agent inside the first supply path 58 and performing feedback control of the pump 41 based on the pressure information. Further, the DCU 60 performs opening and closing control of the reducing agent injection valve 31 by calculating the injection amount of the urea aqueous solution based on an amount of the $NO_x$ discharged from the internal combustion engine, a temperature of the reducing catalyst etc.

As described above, the sensor unit 54 provided inside the tank 50 plays an important role in monitoring whether or not a state is maintained in which the $NO_x$ in the exhaust gas is efficiently reduced and purified by the injected urea aqueous solution. Therefore, when there is a possibility that a rationality of the sensor unit 54 may be lost, it is necessary to replace the sensor unit 54 immediately. Thus, a rationality diagnosis portion of the sensor unit (indicated as "rationality diagnosis" in FIG. 1) is provided in the DCU 60 that is provided in the exhaust gas purification apparatus 10 shown in FIG. 1.

Figure 3:
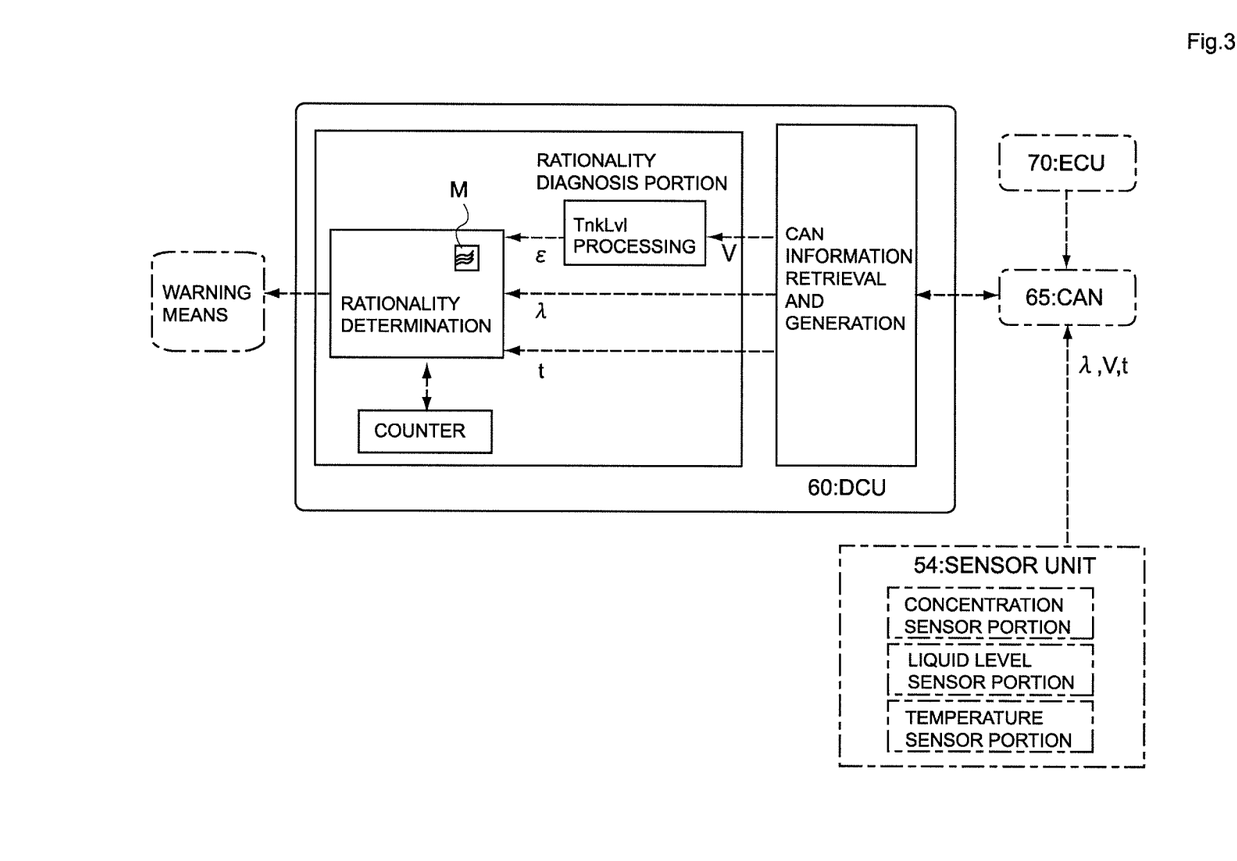
FIG. 3 is a block diagram showing a structural example of a rationality diagnosis apparatus (DCU) according to the first embodiment.

FIG. 3 shows a structural example of portions related to the rationality diagnosis portion of the DCU 60 shown in FIG. 1, the structural example being shown in functional blocks. The rationality diagnosis portion includes a CAN information retrieving and generating portion (indicated as "CAN information retrieval and generating" in FIG. 3), a liquid level sensor value processing portion (indicated as "TnkLvl processing" in FIG. 3), a rationality determining portion (indicated as "rationality determination" in FIG. 3), and a counter etc. In specific terms, these portions are realized through execution of programs by a micro computer (not shown in the figures).

Among them, the CAN information retrieving and generating portion receives the information existing on the CAN 65, including signals from the respective sensor portions provided in the sensor unit 54, and transmits the information to other portions of the DCU 60.

The liquid level sensor value processing portion calculates the relative permittivity $\epsilon$ of the medium based on the voltage value V, which is transmitted as a liquid level sensor value from the CAN information retrieving and generating portion, and transmits the calculation result of the relative permittivity $\epsilon$ to the rationality determining portion. A value of the relative permittivity $\epsilon$ calculated by the liquid level sensor value processing portion differs depending on the state of the medium inside the tank.

With respect to a calculation method of the relative permittivity $\epsilon$ of the medium, when it is assumed that an electrostatic capacitance is C, an electrode area is S and a distance between the electrodes is d, the relationship is expressed as $C=\epsilon \times S \times d$. Thus, as one example, the relative permittivity $\epsilon$ of the medium is calculated using a relational expression $\epsilon=C/S \cdot d$. Among them, the electrostatic capacitance C is acquired with reference to a pre-stored map showing a relationship between the voltage value V and the electrostatic capacitance C. The state of the medium is determined by comparing the value of the relative permittivity $\epsilon$ calculated in this way against each pre-stored value of a relative permittivity of the air ($\epsilon$ air), a relative permittivity of the diesel oil ($\epsilon$ diesel), a relative permittivity of the frozen urea aqueous solution ($\epsilon$ ureaice) and a relative permittivity of the liquefied urea aqueous solution ($\epsilon$ ureawtr).

Note that, for reference, it is generally known that the relative permittivity of the air $\epsilon$ air$\approx$1.0, the relative permittivity of the diesel oil $\epsilon$ diesel$\approx$1.8, a relative permittivity $\epsilon$ of frozen water, namely, ice$\approx$4.2 and a relative permittivity $\epsilon$ of liquid water$\approx$80.

Further, according to an example of the present embodiment, in the sensor unit 54, the heat conductivity rate $\lambda$ of the medium is calculated based on a sensor value from the concentration sensor portion, and the temperature t of the medium is calculated based on a sensor value from the temperature sensor portion. Therefore, any portion for processing the concentration sensor value and the temperature sensor value is not provided in the DCU 60.

However, when the sensor unit 54 is not provided with any portion for calculating the heat conductivity rate $\lambda$ of the medium based on the sensor value of the concentration sensor portion nor with any portion for calculating the temperature t of the medium based on the sensor value of the temperature sensor portion, a concentration sensor value processing portion and a temperature sensor value processing portion are provided in the DCU 60, and the heat conductivity rate $\lambda$ and the temperature t calculated by the portions are transmitted to the rationality determining portion.

When the heat conductivity rate $\lambda$ of the medium is calculated by the concentration sensor value processing portion of the DCU 60, the above-described calculation logic of the heat conductivity rate $\lambda$ that is included in the concentration sensor portion is provided in the concentration sensor value processing portion.

Based on each piece of output information $\epsilon$, $\lambda$ and t, the rationality determining portion determines whether or not the rationality is lost in one of the sensor portions of the sensor unit 54 provided in the tank. Namely, based on calculated values of the heat conductivity rate $\lambda$ and the relative permittivity $\epsilon$, the rationality determining portion can determine respectively whether or not the tank is empty, the diesel oil is contained, the urea aqueous solution is frozen and the urea aqueous solution is in a liquefied state. Further, based on a value of the temperature t, the rationality determining portion can determine whether a temperature of the medium inside the tank is higher than the freezing temperature of the urea aqueous solution or the temperature of the medium is lower than or equal to the freezing temperature. Therefore, the rationality determining portion determines whether or not there is any contradiction in the state of the medium that is mainly determined based on the heat conductivity rate $\lambda$ and the relative permittivity $\epsilon$ of the medium. When it is determined that the urea aqueous solution is in a frozen state or in a liquefied state, the rationality determining portion further determines whether or not there is any contradiction between the state of the urea aqueous solution and the temperature t of the medium.

Then, when there is no contradiction found in the state of the medium and the temperature of the medium, both of which being determined based on the respective sensor values, the rationality determining portion determines that the rationality of the respective sensor portions of the sensor unit 54 is maintained. On the other hand, when there is any contradiction found in the state of the medium and the temperature of the medium, both of which being determined based on the respective sensor values, the rationality determining portion determines that the rationality of one of the sensor portions is lost.

Figure 4:
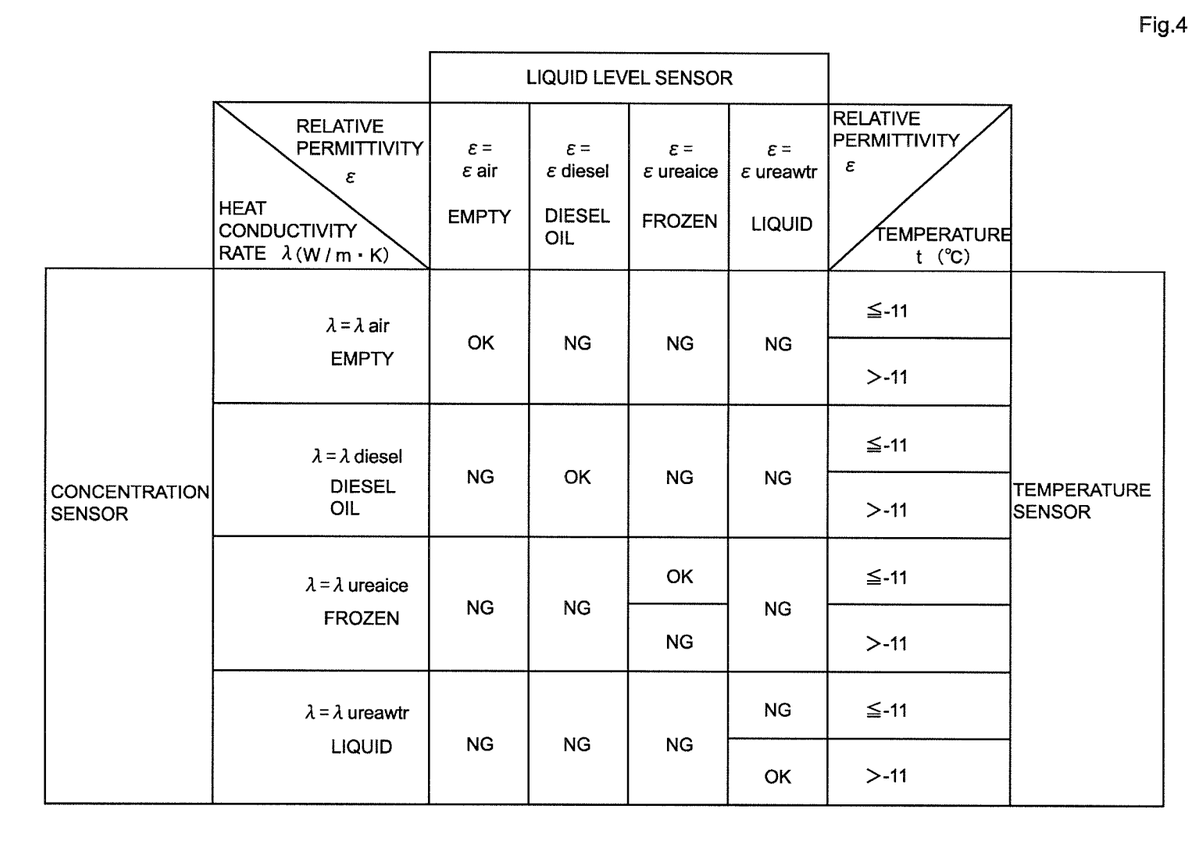
FIG. 4 is a diagram illustrating a rationality diagnosis method according to the first embodiment.

FIG. 4 shows a correspondence table M that describes a specific example of the rationality diagnosis for determining the rationality of the sensor unit by mutually comparing each piece of the information $\epsilon$, $\lambda$ and t, which are input into the rationality determining portion. The correspondence table M is stored in the rationality determining portion of the DCU 60 shown in FIG. 3, and it is used to determine whether or not the rationality of the respective sensor portions of the sensor unit 54 is maintained by comparing the content of each piece of the information $\epsilon$, $\lambda$ and t against the correspondence table M.

Horizontal items in FIG. 4 are items that categorize the state of the medium based on the value of the relative permittivity $\epsilon$ of the medium, and vertical items on the left side are items that categorize the state of the medium based on the value of the heat conductivity rate $\lambda$ of the medium. In addition, vertical items on the right side are items that indicate, for each state of the medium in the concentration sensor portion, whether the detected temperature t is higher than −11° C., which is the freezing temperature of the urea aqueous solution, or it is lower than or equal to −11° C.

In the correspondence table M shown in FIG. 4, the heat conductivity rate of the air ($\lambda$ air), the heat conductivity rate of the diesel oil ($\lambda$ diesel), the heat conductivity rate of the frozen urea aqueous solution ($\lambda$ ureaice), the heat conductivity rate of the liquefied urea aqueous solution ($\lambda$ ureawtr), the relative permittivity of the air ($\epsilon$ air), the relative permittivity of the diesel oil ($\epsilon$ diesel), the relative permittivity of the frozen urea aqueous solution ($\epsilon$ ureaice) and the relative permittivity of the liquefied urea aqueous solution ($\epsilon$ ureawtr) are respectively set based on known values or values calculated in advance through experiments etc.

Then, when there is any contradiction found between the state of the medium which is determined by the heat conductivity rate $\lambda$ calculated based on the sensor value from the concentration sensor portion and the state of the medium which is determined by the relative permittivity $\epsilon$ calculated based on the sensor value from the liquid level sensor portion, the rationality determining portion determines that the rationality of the sensor unit is lost (corresponding to the cells indicated as NG in the figure). On the other hand, even when there is no contradiction found between the state of the medium which is determined by the heat conductivity rate $\lambda$ and the state of the medium which is determined by the relative permittivity $\epsilon$, if the urea aqueous solution is in the frozen or liquefied state, the rationality determining portion further determines whether or not there is any contradiction with the state of the medium indicated by the temperature t of the urea aqueous solution, the temperature t being the sensor value of the temperature sensor portion. Namely, when the heat conductivity rate $\lambda$ and the relative permittivity $\epsilon$ indicate that the urea aqueous solution is in the frozen state, if the temperature t of the urea aqueous solution is higher than the freezing temperature, the rationality determining portion determines that the rationality of the sensor unit is lost. In a similar manner, when the heat conductivity rate $\lambda$ and the relative permittivity $\epsilon$ indicate that the urea aqueous solution is in the liquefied state, if the temperature t of the urea aqueous solution is lower than or equal to the freezing temperature, the rationality determining portion determines that the rationality of the sensor unit is lost.

With respect to other cells which are indicated as OK in the figure, since there is no contradiction in the information $\lambda$, $\epsilon$ and t that are acquired based on the respective sensor values, the rationality determining portion determines that the rationality of the sensor unit is maintained.

When the heat conductivity rate $\lambda$ and the relative permittivity $\epsilon$ do not contradict each other and they indicate that the tank is empty or that the diesel oil is contained inside the tank, an impact of the temperature t of the medium is not taken into account. This is because, with respect to the air, it basically does not change from a gas state, and with respect to the diesel oil, it basically does not change from a liquefied state.

Further, again with reference to FIG. 3, the rationality determining portion according to the present embodiment uses a counter to count the number of times that it is determined that the rationality of the sensor unit 54 is lost. When it is determined that the rationality of the sensor unit 54 is lost a predetermined number of times or more, such as five times or more consecutively, for example, the rationality determining portion outputs a rationality error signal to warning means. With this kind of structure, a possibility of recognizing a rationality error of the sensor unit 54 by a wrong diagnosis is reduced.

When the rationality error signal of the sensor unit 54 is output, the DCU 60, for example, generates a warning sound to arouse the attention of the driver. In this way, the driver can stop the internal combustion engine immediately or can repair or replace the sensor unit.

Note that, since the sensor inside the tank used in the present embodiment is the sensor unit 54 in which the respective sensor portions are integrated, it is not required to identify in which of the sensor portions the rationality is lost, and the rationality diagnosis ends at the time when the above-described rationality error is output. Namely, when it is determined that the rationality is lost in one of the sensor portions, it is necessary to repair or replace the sensor unit 54 as a whole.

However, among the concentration sensor portion, the liquid level sensor portion and the temperature sensor portion, if two of the three sensor portions can individually perform the rationality diagnosis by themselves, after it is determined that the rationality of the sensor unit 54 is lost, it is identified in which of the sensor portions the rationality is lost by performing individual rationality diagnoses. For example, as described above, in the sensor unit 54 according to the present embodiment, although the rationality diagnosis of the liquid level sensor portion cannot be performed by the liquid level sensor portion itself, if the concentration sensor portion and the temperature sensor portion can perform self-diagnosis respectively, it is possible to identify in which of the sensor portions the rationality is lost.

Further, even when the respective sensor portions are not integrated as the sensor unit 54 and the concentration sensor portion, the liquid level sensor portion and the temperature sensor portion are provided individually, the rationality diagnosis according to the present embodiment can be adopted. However, even though it is possible to obtain a diagnosis result indicating that the rationality is lost in at least one of the three sensors by using the rationality diagnosis method for the sensor inside the tank according to the present embodiment, it is not possible to identify in which of the sensors the rationality is lost. In this case, if at least two sensors are provided with a self-diagnosis function, the sensor in which the rationality is lost is identified.

Therefore, it is possible to simplify execution of a diagnosis program by performing the diagnosis method according to the present embodiment as a normally performed diagnosis and performing the self-diagnosis of the individual sensors when it is diagnosed that the rationality is lost in one of the sensors.

Second Embodiment

In a rationality diagnosis apparatus according to a second embodiment of the invention, a structure of a rationality determining portion is different from the structure of the rationality determining portion of the rationality diagnosis apparatus according to the first embodiment.

Differences between the first embodiment and the second embodiment will be mainly described below.

Figure 5:
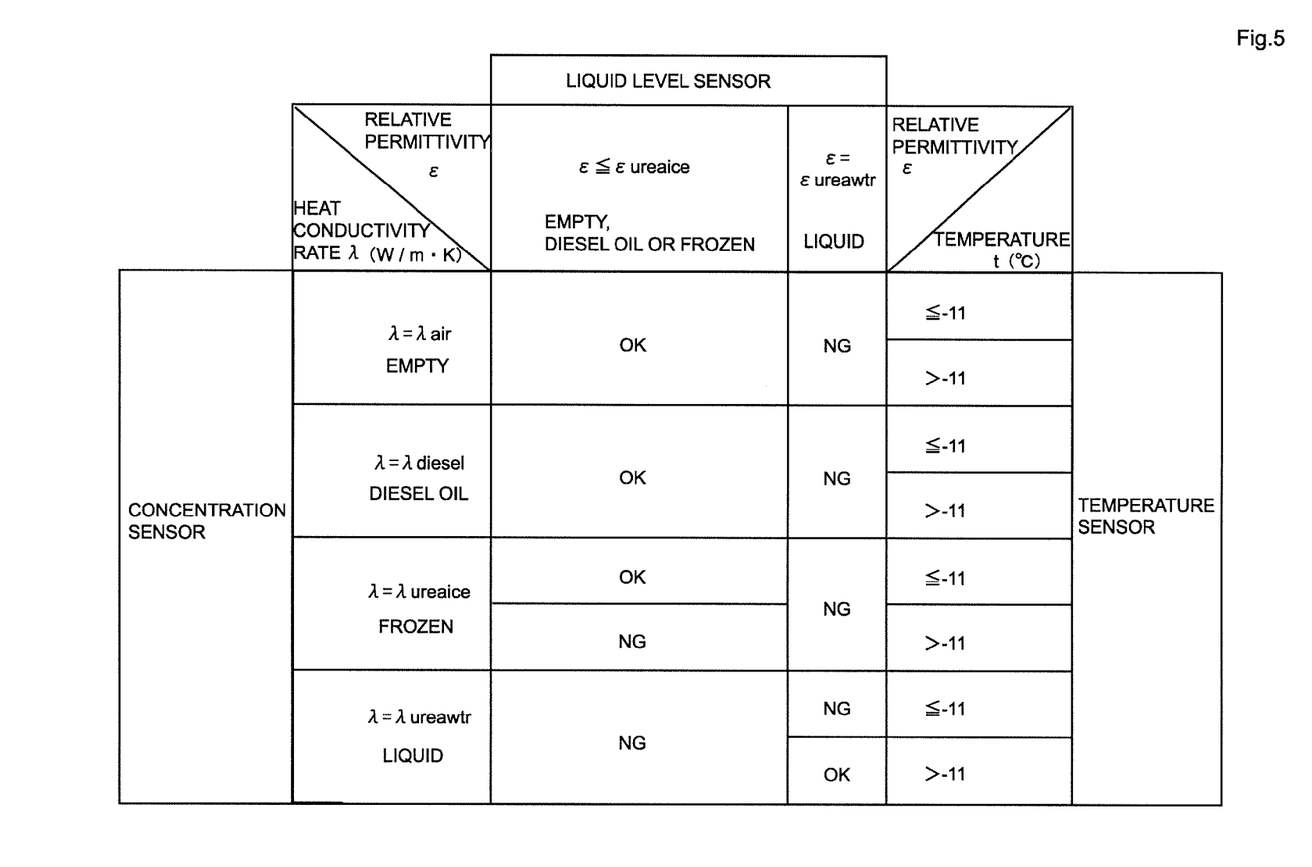
FIG. 5 is a diagram illustrating a rationality diagnosis method according to a second embodiment.

FIG. 5 shows a correspondence table illustrating an example of rationality diagnosis according to the present embodiment. In a similar manner to the correspondence table shown in FIG. 4, horizontal items in FIG. 5 are items that categorize the state of the medium based on the value of the relative permittivity $\epsilon$ of the medium, and vertical items on the left side are items that categorize the state of the medium based on the value of the heat conductivity rate $\lambda$ of the medium. In addition, vertical items on the right side are items that indicate, for each of the states of the medium of the concentration sensor portion, whether the detected temperature t is higher than the freezing temperature ($-11°$ C.) of the urea aqueous solution or whether it is lower than or equal to the freezing temperature.

Note that, with respect to the state of the medium categorized by the relative permittivity $\epsilon$ of the medium, in the first embodiment, the state of the medium is categorized based on whether or not the tank is empty, the diesel oil is contained in the tank, the urea aqueous solution is frozen or the urea aqueous solution is in the liquefied state. However, in the present embodiment, the state of the medium is categorized by two items, namely, based on whether the urea aqueous solution is in the liquefied state or otherwise. This is because, when the relative permittivity $\epsilon$ of the medium is calculated in the DCU based on the sensor value of the liquid level sensor portion, there is a possibility that it cannot be determined accurately whether the tank is empty inside, the diesel oil is contained or the urea aqueous solution is frozen, since a variation of the calculation result becomes large depending on a processing capability of the DCU. Meanwhile, differences are small among the respective relative permittivities $\epsilon$ air, $\epsilon$ diesel and $\epsilon$ ureaice, namely, the relative permittivities at the times of when the tank is empty, when the diesel oil is contained and when the urea aqueous solution is frozen.

Therefore, in the present embodiment, the rationality determining portion determines whether the urea aqueous solution of the liquefied state is contained inside the tank ($\epsilon = \epsilon$ ureawtr) or otherwise ($\epsilon \leq \epsilon$ ureaice) based on the value of the relative permittivity output from the liquid level sensor value processing portion.

Then, when a value of the heat conductivity rate $\lambda$ of the medium which is acquired based on the sensor value of the concentration sensor portion indicates that the tank is empty, that the diesel oil is contained or that the urea aqueous solution is frozen, if a value of the relative permittivity $\epsilon$ indicates that the urea aqueous solution is in the liquefied state, the rationality determining portion determines that there is a contradiction between the sensor value of the liquid level sensor portion and the sensor value of the concentration sensor portion. In a similar manner, when the value of the heat conductivity rate $\lambda$ indicates that the urea aqueous solution is in the liquefied state, if the value of the relative permittivity $\epsilon$ indicates that the tank is empty, that the diesel oil is contained or that the urea aqueous solution is frozen, the rationality determining portion also determines that there is a contradiction between the sensor value of the liquid level sensor portion and the sensor value of the concentration sensor portion.

On the other hand, even when there is no contradiction between the state of the medium determined by the heat conductivity rate $\lambda$, which is calculated based on the sensor value of the liquid level sensor portion and the state of the medium determined by the relative permittivity $\epsilon$, which is calculated based on the sensor value of the concentration sensor portion, if the urea aqueous solution is in the frozen or liquefied state, the rationality determining portion determines whether or not there is any contradiction with the state of the medium indicated by the temperature t of the urea aqueous solution, namely, with the sensor value of the temperature sensor portion. In other words, when the heat conductivity rate $\lambda$ and the relative permittivity $\epsilon$ indicate that the urea aqueous solution is in the frozen state, if the temperature t of the urea aqueous solution is higher than the freezing temperature, the rationality determining portion determines that the rationality of the sensor unit is lost. In a similar manner, when the heat conductivity rate $\lambda$ and the relative permittivity $\epsilon$ indicate that the urea aqueous solution is in the liquefied state, if the temperature t of the urea aqueous solution is lower than or equal to the freezing temperature, the rationality determining portion also determines that the rationality of the sensor unit is lost.

Again, in the present embodiment, the structure of the sensor inside the tank is not limited to the sensor unit, and in a similar manner to the first embodiment, the concentration sensor, the liquid level sensor and the temperature sensor may be provided individually. In addition, the liquid level sensor portion may have a structure in which only one detecting portion having a pair of the electrodes is provided or it may have a structure in which a plurality of detecting portions are provided.

Third Embodiment

A rationality diagnosis apparatus according to a third embodiment of the invention performs the rationality diagnosis for a sensor unit having a different structure of the liquid level sensor portion from the liquid level sensor portion according to the first embodiment and to the second embodiment. Further, as the structure of the liquid level sensor portion is different, a procedure for performing the rationality diagnosis is different from the procedure according to the first embodiment and to the second embodiment.

Differences from the first embodiment and the second embodiment will be mainly described below.

1. Structure of the Liquid Level Sensor Portion

Figure 6:
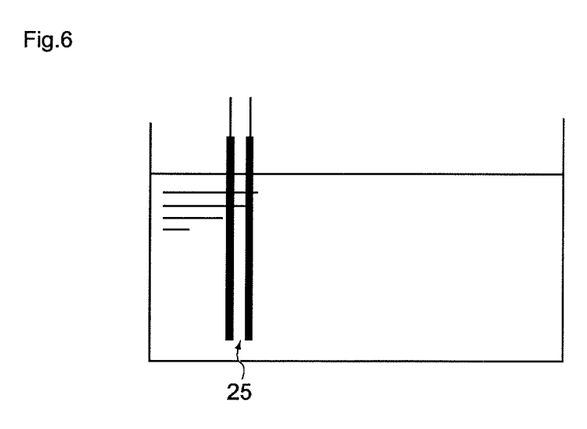
FIG. 6 is a diagram illustrating a structural example of a liquid level sensor that is used in a sensor unit according to a third embodiment.

As shown in FIG. 6, the liquid level sensor portion of the sensor unit used in the present embodiment has a first electrode and a second electrode opposing each other and each having a predetermined length along the height direction inside the tank. Further, the liquid level sensor portion of the sensor unit used in the present embodiment is provided with a liquid level detecting body that forms a capacitor in which an electrostatic capacitance changes according to the liquid level of the medium between the first electrode and the second electrode. The first electrode and the second electrode may be opposed plate electrodes or may be double-tube electrodes being formed with an inner electrode and an outer electrode.

The liquid level sensor portion used in the above-described first embodiment and second embodiment recognizes that the medium exists up to the predetermined height, when the voltage V, which is generated when the predetermined alternating voltage is applied to the detecting portion having a pair of the electrodes and being arranged at the predetermined height location, becomes greater than or equal to the predetermined value. In contrast, the liquid level sensor portion used in the present embodiment can linearly recognize the remaining amount of the medium based on an amount of change $\Delta C$ of the electrostatic capacitance with respect to a standard electrostatic capacitance $C_0$ of a state in which the tank is empty inside.

When the liquid level sensor portion having the structure according to the present embodiment is used, it is possible to measure the liquid level of the urea aqueous solution, assuming that a normal urea aqueous solution is contained inside the tank.

However, since an area of the electrodes immersed in the liquid differs depending on the remaining amount of the liquid inside the tank, when the rationality diagnosis is performed to determine the state of the medium by calculating the relative permittivity ε of the medium based on the sensor value of the liquid level sensor portion, it is difficult to determine whether or not a difference in the electrostatic capacitance simply depends on the state of the medium. Namely, it is difficult to determine whether the amount of change ΔC of the electrostatic capacitance is caused simply by the state of the medium or by a difference in the liquid level of the medium.

When this type of the liquid level sensor portion is used, it is not easy to calculate the relative permittivity ε of the medium using the voltage value in a similar manner to the first embodiment and the second embodiment, the voltage value being generated when the alternating voltage is applied between the first electrode and the second electrode. Therefore, in the rationality diagnosis apparatus for the sensor inside the tank according to the present embodiment, the rationality diagnosis is performed assuming that the urea aqueous solution is fully filled inside the tank when the urea aqueous solution is refilled into the tank.

2. Rationality Diagnosis Apparatus and Rationality Diagnosis Method for the Sensor Inside the Tank A structure of a DCU according to the present embodiment is basically similar to the structure of the DCU described in relation to the first embodiment and the second embodiment, and the correspondence table shown in FIG. 4 or FIG. 5 is provided in the rationality determining portion.

In a rationality diagnosis method according to the present embodiment, first, the rationality diagnosis is performed in a similar manner to the rationality diagnosis method described in relation to the first embodiment and the second embodiment, at the timing when the medium is fully filled inside the tank. When a timing is just after the medium is refilled, by causing the DCU to store the relative permittivity ε of each medium in advance on the assumption that the medium is fully filled inside the tank, the state of the medium is determined based on the value of the relative permittivity ε detected by the liquid level sensor portion.

Note that when the timing is just after the medium is refilled, as a matter of course, the tank is not empty, and it can be said to be less likely that the medium is frozen.

In the rationality diagnosis performed just after the medium is refilled, when the states of the medium that are assumed based on the respective sensor values contradict one another, the rationality determining portion determines that the rationality is lost in one of the sensors. On the other hand, in the rationality diagnosis performed just after the medium is refilled, when it is determined that the rationality of the sensor unit is maintained, the medium which is refilled into the tank is identified. Therefore, when the rationality diagnosis is performed subsequently, as the medium inside the tank is already identified, the state of the medium inside the tank is assumed based on the value of the relative permittivity ε detected by the liquid level sensor portion, even when the remaining amount of the medium inside the tank is not full. As a result, even when the liquid level sensor portion, which can linearly recognize the remaining amount of the medium based on the amount of change ΔC of the electrostatic capacitance with respect to the standard electrostatic capacitance $C_0$ of the state in which the tank is empty inside, is used, the rationality diagnosis described in relation to the first embodiment and the second embodiment can be performed.

Namely, when the liquid level sensor portion, which is provided with the first electrode and the second electrode opposing each other and which can linearly measure the remaining amount of the medium inside the tank, is used, the DCU can determine whether or not there is any contradiction among the sensor values by performing the rationality diagnosis every time the medium is refilled and by identifying the type of the medium before performing the rationality diagnosis subsequently.

Note that in actuality, when the rationality diagnosis is performed just after the medium is refilled, if it is determined that the medium inside the tank is the diesel oil, since it is not possible to continue to use the diesel oil as the reducing agent instead of the urea aqueous solution, a warning is issued to the driver, etc.

The invention claimed is:

1. A rationality diagnosis method for a sensor inside a tank, the rationality diagnosis method including the step of:
performing a rationality diagnosis of a concentration sensor, a liquid level sensor, and a temperature sensor that are provided inside the tank that stores liquid in order to determine whether there is a necessity to repair or replace the sensors, to diagnose whether rationality is lost in one of the concentration sensor, the liquid level sensor, and the temperature sensor, by determining whether there exists any contradiction between respective sensor values detected by the concentration sensor, the liquid level sensor, and the temperature sensor,
wherein the rationality diagnosis is performed by determining a respective state of the liquid for each of the sensor values based on each of the sensor values and by determining whether there exists any contradiction between the respective determined states of the liquid.

2. The rationality diagnosis method according to claim 1, further comprising determining, based on the sensor values of the concentration sensor, and the liquid level sensor, whether the liquid is in one of states of being frozen, being liquefied and being in deficiency, and determining whether there exists any contradiction between the respective determined states of the liquid, based on the sensor value of the temperature sensor, whether the liquid is in one of the states of being frozen and being liquefied.

3. A rationality diagnosis method for a sensor inside a tank, the rationality diagnosis method including the step of:
performing a rationality diagnosis of a concentration sensor, a liquid level sensor, and a temperature sensor that are provided inside the tank that stores liquid in order to determine whether there is a necessity to repair or replace the sensors, to diagnose whether rationality is lost in one of the concentration sensor, the liquid level sensor, and the temperature sensor, by determining whether there exists any contradiction between respective sensor values detected by the concentration sensor, the liquid level sensor, and the temperature sensor,
wherein the rationality diagnosis is performed based on a value of a heat conductivity rate that is acquired based on the sensor value of the concentration sensor.

4. The rationality diagnosis method according to claim 1, wherein the rationality diagnosis is performed based on a value of a heat conductivity rate that is acquired based on the sensor value of the concentration sensor.

5. The rationality diagnosis method according to claim 2, wherein the rationality diagnosis is performed based on a value of a heat conductivity rate that is acquired based on the sensor value of the concentration sensor.

6. The rationality diagnosis method according to claim 1, wherein the rationality diagnosis is performed based on a value of a relative permittivity that is acquired based on the sensor value of the liquid level sensor.

7. The rationality diagnosis method according to claim 2, wherein the rationality diagnosis is performed based on a value of a relative permittivity that is acquired based on the sensor value of the liquid level sensor.

8. A rationality diagnosis apparatus for a sensor inside a tank, the rationality diagnosis apparatus performing a rationality diagnosis of a concentration sensor, a liquid level sensor, and a temperature sensor that are provided inside the tank that stores liquid in order to determine as to whether there is a necessity to repair or replace the sensors, the rationality diagnosis apparatus comprising a rationality determining portion which diagnoses whether rationality is lost in one of the concentration sensor, the liquid level sensor, and the temperature sensor by determining whether there exists any contradiction between respective states of the liquid by mutually comparing a first signal that indicates the state of the liquid acquired based on a sensor value of the concentration sensor, a second signal that indicates the state of the liquid acquired based on a sensor value of the liquid level sensor, and a third signal that indicates the state of the liquid acquired based on a sensor value of the temperature sensor.

* * * * *